US012669152B2

(12) United States Patent
Lessley et al.

(10) Patent No.: US 12,669,152 B2
(45) Date of Patent: Jun. 30, 2026

(54) TORQUE LIMITING FLEX PLATE ASSEMBLY

(71) Applicant: FCA US LLC, Auburn Hills, MI (US)

(72) Inventors: Andrew R Lessley, Ferndale, MI (US); Michael E Fingerman, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 333 days.

(21) Appl. No.: 18/479,528

(22) Filed: Oct. 2, 2023

(65) Prior Publication Data

US 2025/0109770 A1     Apr. 3, 2025

(51) Int. Cl.
| *F16D 7/02* | (2006.01) |
| *F16D 3/79* | (2006.01) |
| F16D 3/78 | (2006.01) |

(52) U.S. Cl.
CPC .............. *F16D 7/025* (2013.01); *F16D 3/79* (2013.01); *F16D 3/78* (2013.01); *F16D 7/027* (2013.01)

(58) Field of Classification Search
CPC ... F16D 7/025; F16D 3/79; F16D 3/78; F16D 7/027
USPC ...................................................... 464/46, 98
See application file for complete search history.

(56) References Cited

U.S. PATENT DOCUMENTS

| 3,323,328 A | * | 6/1967 | Montgomery | .......... F16D 47/02 |
| | | | | 464/46 |
| 8,814,708 B2 | * | 8/2014 | Odaka | ..................... F16D 7/025 |
| | | | | 464/46 |

FOREIGN PATENT DOCUMENTS

| CN | 102667228 A | | 9/2012 | |
| CN | 109416083 A | * | 3/2019 | |
| DE | W 15445 XII | * | 12/1956 | ...................... 464/46 |
| DE | 102021100464 A1 | | 7/2021 | |

* cited by examiner

*Primary Examiner* — Greg Binda
(74) *Attorney, Agent, or Firm* — Jeremy J. Klobucar

(57) ABSTRACT

A torque limiting flex plate assembly includes a flex plate configured to couple to a crankshaft of an internal combustion engine of a vehicle, and a torque limiting clutch assembly integrated with the flex plate. The torque limiting clutch assembly is in frictional engagement with the flex plate such that the torque limiting clutch assembly and the flex plate are coupled for common rotation during normal engine operation. Upon receiving a torque spike from a transmission input shaft, the torque limiting clutch assembly is configured to slip such that the flex plate and the torque limiting clutch assembly rotate independently at different speeds to thereby prevent the torque spike from being transferred through the flex plate to the internal combustion engine.

16 Claims, 2 Drawing Sheets

TORQUE LIMITING FLEX PLATE ASSEMBLY

FIELD

The present application relates generally to engine torque transmitting systems and, more particularly, to a torque limiting flex plate assembly for an internal combustion engine.

BACKGROUND

Internal combustion engines are not designed to receive torque transmitted in a direction opposite from normal operation. Such undesirable torque may be transferred from vehicle wheels through the driveline and transmission. Additionally, electric motors in hybrid transmissions may also cause additional peak spike loads transmitted to the engine. Conventional automatic transmissions utilize a torque converter or clutch slip to reduce or prevent this torque from reaching the engine. Further, some engines produce a significant amount of torsional vibration through the crankshaft from engine firing cadence. This high torsional vibration is transmitted from the crankshaft to the flex plate and torsional mitigation device to the transmission input shaft. Dual mass flywheels and pendulum absorbers are some of the most effective devices to mitigate such torsional vibration, but they take up more space than conventional transmission torsional mitigation devices. Thus, while such conventional systems work for their intended purpose, it is desirable to provide continuous improvement in the relevant art.

SUMMARY

In accordance with one example aspect of the invention, a torque limiting flex plate assembly for a vehicle is provided. In one example implementation, the torque limiting flex plate assembly includes a flex plate configured to couple to a crankshaft of an internal combustion engine of the vehicle and a torque limiting clutch assembly integrated with the flex plate. The torque limiting clutch assembly is in frictional engagement with the flex plate such that the torque limiting clutch assembly and the flex plate are coupled for common rotation during normal engine operation. Upon receiving a torque spike from a transmission input shaft, the torque limiting clutch assembly is configured to slip such that the flex plate and the torque limiting clutch assembly rotate independently at different speeds to thereby prevent the torque spike from being transferred through the flex plate to the internal combustion engine.

In addition to the foregoing, the described torque limiting flex plate assembly may include one or more of the following features: wherein the torque limiting clutch assembly includes a housing plate, a mating plate, and a torque limiting clutch disposed between the housing plate and the mating plate, the torque limiting clutch in frictional engagement with the flex plate; wherein the torque limiting clutch is compressed between the housing plate and the mating plate; wherein the torque limiting clutch includes a pair of opposed clutch discs disposed on either side of the flex plate; and wherein the opposed clutch discs are in frictional engagement with an outer diameter of the flex plate.

In addition to the foregoing, the described torque limiting flex plate assembly may include one or more of the following features: wherein the torque limiting clutch includes a reaction plate configured to engage the torque limiting clutch to establish the frictional engagement with the flex plate; wherein the torque limiting clutch further includes a biasing structure disposed between the housing plate and the reaction plate, the biasing structure configured to bias the reaction plate into the torque limiting clutch to establish the frictional engagement with the flex plate; wherein the biasing structure is a spring; wherein the spring is a Belleville spring; and wherein the flex plate is disposed within a housing of the torque limiting clutch assembly.

In accordance with another example aspect of the invention, a drivetrain for a vehicle is provided. In one example implementation, the drivetrain includes an internal combustion engine having a crankshaft, a transmission having an input shaft, and a torque limiting flex plate assembly operably disposed between the crankshaft and the transmission input shaft. The torque limiting flex plate assembly includes a flex plate coupled to the crankshaft, and a torque limiting clutch assembly integrated with the flex plate. The torque limiting clutch assembly is in frictional engagement with the flex plate such that the torque limiting clutch assembly and the flex plate are coupled for common rotation during normal engine operation. Upon receiving a torque spike from the transmission input shaft, the torque limiting clutch assembly is configured to slip such that the flex plate and the torque limiting clutch assembly rotate independently at different speeds to thereby prevent the torque spike from being transferred through the flex plate to the internal combustion engine.

In addition to the foregoing, the described drivetrain may include one or more of the following features: wherein the torque limiting clutch assembly includes a housing plate, a mating plate, and a torque limiting clutch disposed between the housing plate and the mating plate, the torque limiting clutch in frictional engagement with the flex plate; wherein the torque limiting clutch is compressed between the housing plate and the mating plate; wherein the torque limiting clutch includes a pair of opposed clutch discs disposed on either side of the flex plate; and wherein the opposed clutch discs are in frictional engagement with an outer diameter of the flex plate.

In addition to the foregoing, the described drivetrain may include one or more of the following features: wherein the torque limiting clutch includes a reaction plate configured to engage the torque limiting clutch to establish the frictional engagement with the flex plate; wherein the torque limiting clutch further includes a biasing structure configured to bias the reaction plate into the torque limiting clutch to establish the frictional engagement with the flex plate; wherein the biasing structure is a spring; wherein the spring is a Belleville spring; and wherein the flex plate is disposed within a housing of the torque limiting clutch assembly.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously mentioned, engines may receive torque transmitted in the opposite rotational direction from normal operation. Moreover, in hybrid vehicle applications, electric motors may cause additional peak spike loads transmitted to the engine. In addition, the engine may produce torsional vibration resulting in potential NVH issues. When packaging space becomes limited, traditional torsional mitigation devices may not be able to be packaged in a conventional manner.

Accordingly, the systems and methods described herein integrate a torque limiting clutch into a flex plate assembly to provide a torque limiter in the space between the torsional mitigation device and the rear face of the engine block. The resulting torque limiting flex plate assembly is unlike typical transmission torque limiting devices, which are either integrated into the transmission or within the torsional mitigation device itself. This allows larger, more effective torsional mitigation devices to be utilized within existing transmission packaging. In this way, the current system does not require a torque limiting clutch in the transmission or the torsional mitigation device, and maximizes the space used between the engine block rear face and transmission bell housing to allow for a more capable torsional mitigation device to be utilized.

Figure 1:
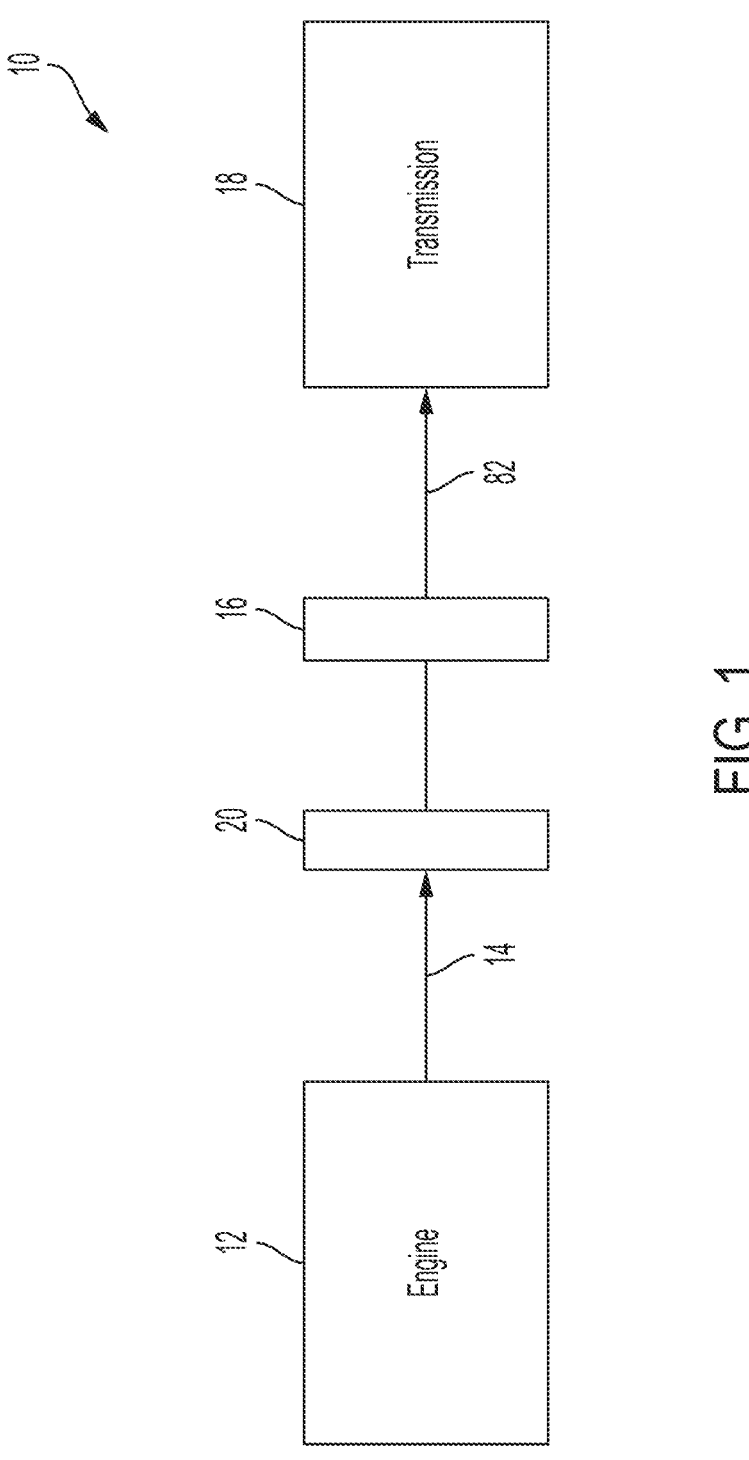
FIG. 1 is a schematic diagram of an example vehicle drivetrain having a torque limiting flex plate assembly in accordance with the principles of the present application.

Referring now to FIG. 1, an example vehicle drivetrain 10 is illustrated in accordance with the principles of the present disclosure. In the example embodiment, the drivetrain 10 generally includes an engine 12, a crankshaft 14, and a torsional mitigation device 16 operably connected to a transmission 18. A torque limiting flex plate assembly 20 is incorporated into the drivetrain 10 between the engine 12 and the torsional mitigation device 16 and transmission 18. In the example embodiment, the torsional mitigation device 16 may be a damper or a torque converter with an integrated damper assembly (not shown).

Figure 2:
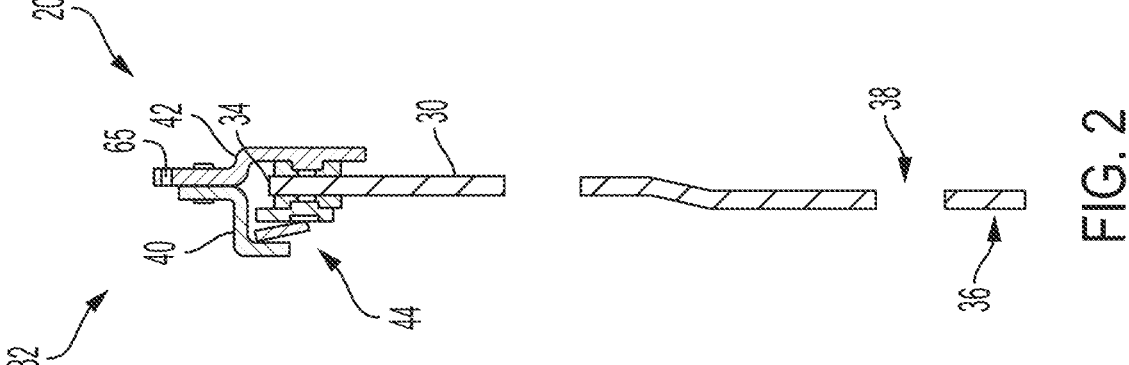
FIG. 2 is an example cross-sectional view of the torque limiting flex plate assembly of FIG. 1, in accordance with the principles of the present application.

With additional reference to FIGS. 2 and 3, the torque limiting flex plate assembly 20 will be described in more detail. In the example embodiment, the torque limiting flex plate assembly 20 generally includes a flex plate 30 disposed within a torque limiting clutch assembly 32. The flex plate 30 is a generally annular disc having an outer diameter 34 and an inner diameter 36. The flex plate 30 is coupled to the crankshaft 14 and is configured to transmit engine torque to the torque converter 16. For example, the flex plate 30 includes a plurality of circumferentially arranged apertures 38 (only one shown) each configured to receive a bolt (not shown) for coupling to the crankshaft 14.

In the example embodiment, the torque limiting clutch assembly 32 generally includes a first plate or housing plate 40 and a second plate or mating plate 42 that form a housing for a torque limiting clutch 44 disposed therebetween. The housing plate 40 is generally annular and includes an outer diameter 46 and an inner diameter 48. The outer diameter 46 includes a plurality of circumferentially arranged apertures 50 (only one shown) each configured to receive a fastener 52 such as, for example, a rivet or bolt. As shown, the inner diameter 48 defines a flange 54 configured to facilitate securing the torque limiting clutch 44 between the housing plate 40 and the mating plate 42.

In the example embodiment, the mating plate 42 is generally annular and includes an outer diameter 60 and an inner diameter 62. The outer diameter 60 includes a first plurality of circumferentially arranged apertures 64 (only one shown) each configured to receive one fastener 52 for coupling of the mating plate 42 to the housing plate 40. The outer diameter 60 also includes a second plurality of circumferentially arranged apertures 65 (only one shown) each configured to receive one fastener (not shown) for coupling to the torsional mitigation device 16. As shown, the inner diameter 62 defines a flange 66 configured to further facilitate securing the torque limiting clutch 44 between the housing plate 40 and the mating plate 42.

Figure 3:
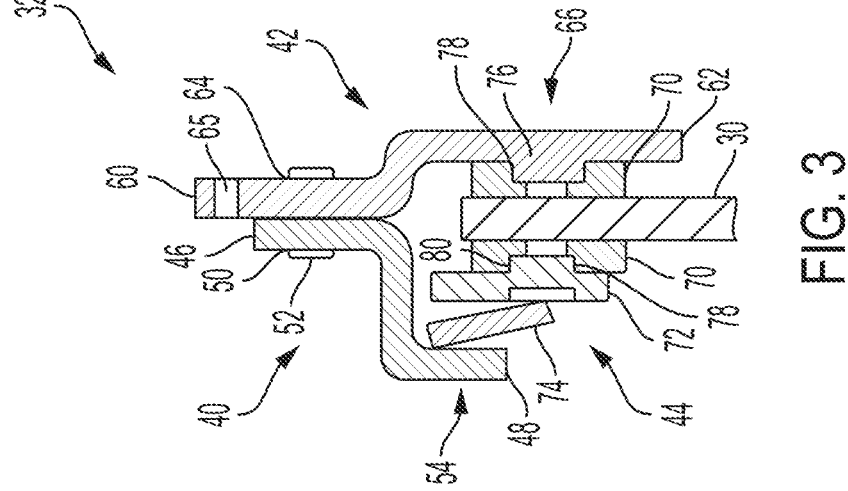
FIG. 3 is an enlarged view of a portion of the torque limiting flex plate assembly shown in FIG. 2, in accordance with the principles of the present application.

As shown in FIG. 3, in the example implementation, the torque limiting clutch 44 generally includes a pair of opposed clutch discs 70, a reaction plate 72, and a biasing structure 74 (e.g., a spring, such as a Belleville spring). The opposed clutch discs 70 are disposed on opposite sides of the flex plate outer diameter 34 such that one clutch disc 70 is disposed between the flex plate 30 and the mating plate flange 66, and the other clutch disc 70 is disposed between the flex plate 30 and the reaction plate 72. In one example, as illustrated, the mating plate flange 66 includes an outwardly extending projection 76 configured to be received within a recess 78 formed within the one clutch disc 70. Similarly, the reaction plate 72 includes an outwardly extending projection 80 configured to be received within recess 78 formed in the other clutch disc 70. In this way, the clutch discs 70 are arranged securely and properly within the housing 40, 42 in relation to the flex plate 30.

In the example embodiment, the biasing structure 74, shown as a Belleville spring, is disposed between the housing plate flange 54 and the reaction plate 72. The biasing structure 74 is compressed through the components stacked between the housing plate 40 and the mating plate 42 such that the biasing structure 74 applies a compression force to the clutch plates 70 through the reaction plate 72. This results in static friction between the flex plate 30 and the clutch discs 70, thereby causing the mating plate 42 to rotate with the flex plate 30 under normal operation. When a torque spike from a transmission input shaft 82 is transmitted to the mating plate 42 through the torsional mitigation device 16 (FIG. 1), the clutch discs 70 will slip and allow the flex plate 30 and the mating plate 42 to rotate independently at different speeds. This advantageously prevents torque from being transmitted through the flex plate 30 to the engine 12.

Described herein are systems and methods for reducing reverse torque and torsional vibrations in a hybrid electric vehicle. The system includes a flex plate integrated into a torque limiting clutch assembly, which includes a housing, a clutch operably coupled to the flex plate outer diameter, a reaction plate, and a spring. The spring provides a biasing force through the reaction plate to the clutch such that the clutch frictionally engages the flex plate for common rotation under normal conditions. Upon a torque spike from the transmission, the flex plate and clutch slip to prevent the torque from being transmitted to the engine.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A torque limiting flex plate assembly for a vehicle, comprising:
   a flex plate configured to couple to a crankshaft of an internal combustion engine of the vehicle; and
   a torque limiting clutch assembly integrated with the flex plate and including a housing plate, a mating plate, and a torque limiting clutch disposed between the housing plate and the mating plate, the torque limiting clutch in frictional engagement with the flex plate,
   wherein the torque limiting clutch includes a pair of opposed clutch discs disposed on either side of the flex plate,
   wherein the torque limiting clutch assembly is in frictional engagement with the flex plate such that the torque limiting clutch assembly and the flex plate are coupled for common rotation during normal engine operation, and
   wherein upon receiving a torque spike from a transmission input shaft, the torque limiting clutch assembly is configured to slip such that the flex plate and the torque limiting clutch assembly rotate independently at different speeds to thereby prevent the torque spike from being transferred through the flex plate to the internal combustion engine.

2. The torque limiting flex plate assembly of claim 1, wherein the torque limiting clutch is compressed between the housing plate and the mating plate.

3. The torque limiting flex plate assembly of claim 1, wherein the opposed clutch discs are in frictional engagement with an outer diameter of the flex plate.

4. The torque limiting flex plate assembly of claim 1, wherein the torque limiting clutch includes a reaction plate configured to engage the torque limiting clutch to establish the frictional engagement with the flex plate.

5. The torque limiting flex plate assembly of claim 4, wherein the torque limiting clutch further includes a biasing structure disposed between the housing plate and the reaction plate, the biasing structure configured to bias the reaction plate into the torque limiting clutch to establish the frictional engagement with the flex plate.

6. The torque limiting flex plate assembly of claim 5, wherein the biasing structure is a spring.

7. The torque limiting flex plate assembly of claim 6, wherein the spring is a Belleville spring.

8. The torque limiting flex plate assembly of claim 1, wherein the flex plate is disposed within a housing of the torque limiting clutch assembly.

9. A drivetrain for a vehicle, comprising:
   an internal combustion engine having a crankshaft;
   a transmission having an input shaft; and
   a torque limiting flex plate assembly operably disposed between the crankshaft and the transmission input shaft, comprising:
      a flex plate coupled to the crankshaft; and
      a torque limiting clutch assembly integrated with the flex plate and including a housing plate, a mating plate, and a torque limiting clutch disposed between the housing plate and the mating plate, the torque limiting clutch in frictional engagement with the flex plate,
      wherein the torque limiting clutch includes a pair of opposed clutch discs disposed on either side of the flex plate,
   wherein the torque limiting clutch assembly is in frictional engagement with the flex plate such that the torque limiting clutch assembly and the flex plate are coupled for common rotation during normal engine operation, and
   wherein upon receiving a torque spike from the transmission input shaft, the torque limiting clutch assembly is configured to slip such that the flex plate and the torque limiting clutch assembly rotate independently at different speeds to thereby prevent the torque spike from being transferred through the flex plate to the internal combustion engine.

10. The drivetrain of claim 9, wherein the torque limiting clutch is compressed between the housing plate and the mating plate.

11. The drivetrain of claim 9, wherein the opposed clutch discs are in frictional engagement with an outer diameter of the flex plate.

12. The drivetrain of claim 9, wherein the torque limiting clutch includes a reaction plate configured to engage the torque limiting clutch to establish the frictional engagement with the flex plate.

13. The drivetrain of claim 12, wherein the torque limiting clutch further includes a biasing structure configured to bias the reaction plate into the torque limiting clutch to establish the frictional engagement with the flex plate.

14. The drivetrain of claim 13, wherein the biasing structure is a spring.

15. The drivetrain of claim 14, wherein the spring is a Belleville spring.

16. The drivetrain of claim 9, wherein the flex plate is disposed within a housing of the torque limiting clutch assembly.

* * * * *